United States Patent
Sturt

(10) Patent No.: US 7,267,406 B2
(45) Date of Patent: Sep. 11, 2007

(54) FOLDABLE VEHICLE SEAT

(75) Inventor: Alan Sturt, W. Bloomfield, MI (US)

(73) Assignee: Lear Corporation, Southfield, MI (US)

(*) Notice: Subject to any disclaimer, the term of this patent is extended or adjusted under 35 U.S.C. 154(b) by 132 days.

(21) Appl. No.: 11/255,805

(22) Filed: Oct. 21, 2005

(65) Prior Publication Data

US 2007/0102983 A1    May 10, 2007

(51) Int. Cl.
*B60N 2/36* (2006.01)
(52) U.S. Cl. ............... 297/378.12; 297/331; 297/335; 297/378.1; 297/15; 297/452.13; 297/452.56
(58) Field of Classification Search ............ 297/378.1, 297/378.12, 382, 331, 335, 15, 452.13, 452.56
See application file for complete search history.

(56) References Cited

U.S. PATENT DOCUMENTS

| | | | |
|---|---|---|---|
| 4,227,736 A | 10/1980 | Lebault et al. | |
| 4,805,953 A | 2/1989 | Yamauchi | |
| 5,013,089 A | 5/1991 | Abu-Isa et al. | |
| 5,273,336 A | 12/1993 | Schubring et al. | |
| 5,482,346 A | 1/1996 | Lesourd | |
| 5,570,931 A | 11/1996 | Kargilis et al. | |
| 5,582,463 A | 12/1996 | Linder et al. | |
| 5,941,602 A | 8/1999 | Sturt et al. | |
| 6,113,191 A | 9/2000 | Seibold | |
| 6,199,951 B1 | 3/2001 | Zeile et al. | |
| 6,371,558 B1 | 4/2002 | Couasnon | |
| 6,375,255 B1 | 4/2002 | Maruta et al. | |
| 6,450,579 B1 | 9/2002 | Nylander et al. | |
| 6,648,395 B2 | 11/2003 | Hoshino | |
| 6,736,459 B1 * | 5/2004 | Sturt | 297/378.1 |
| 6,749,247 B1 | 6/2004 | Mack et al. | |
| 6,860,561 B2 | 3/2005 | Takata | |
| 6,871,669 B2 | 3/2005 | Meyer et al. | |
| 6,871,670 B2 | 3/2005 | Suzuki et al. | |
| 6,874,840 B2 * | 4/2005 | Neale | 297/15 X |
| 6,908,155 B1 | 6/2005 | Wieclawski | |
| 6,935,682 B2 | 8/2005 | Park | |

FOREIGN PATENT DOCUMENTS

DE    100 55 205    6/2002
EP    0 030 924    6/1981

* cited by examiner

*Primary Examiner*—Rodney B. White
(74) *Attorney, Agent, or Firm*—MacMillan, Sobanski & Todd, LLC

(57) ABSTRACT

A foldable vehicle seat assembly includes a seat back frame having a lower end adapted to be supported relative to a vehicle floor to permit movement of the seat back frame between an upper, deployed position and a lowered, stowed position. A seat cross member is adapted to be supported relative to the vehicle floor in a spaced relation to the seat back frame. A seat suspension member, constructed of a flexible material, has a rear portion connected to the seat back frame and a front portion connected to the cross member. When the seat back frame is moved between the deployed position and the stowed position, the cross member and the suspension member are also moved between a deployed position and a stowed position.

20 Claims, 4 Drawing Sheets

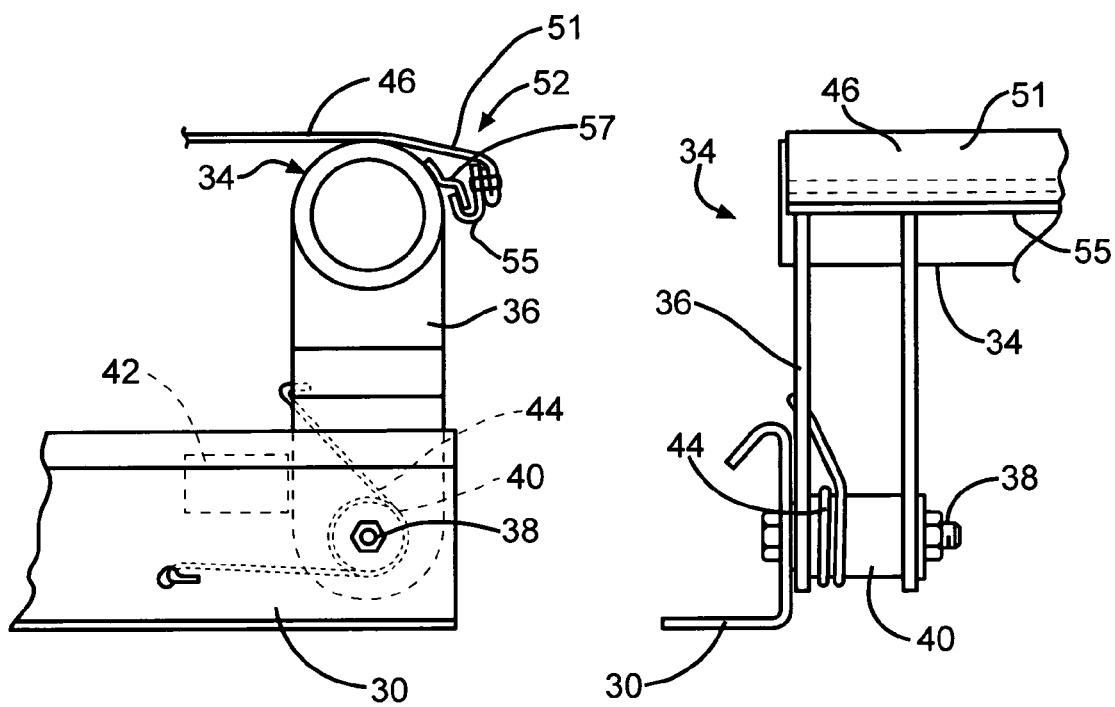
FIG. 3
FIG. 4
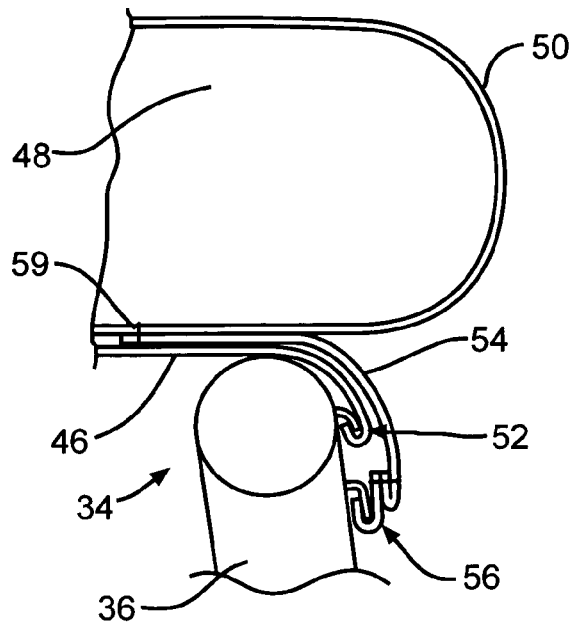
FIG. 5

FOLDABLE VEHICLE SEAT

BACKGROUND OF THE INVENTION

This invention relates in general to foldable vehicle seats.

Foldable seats are becoming increasingly popular in vehicles, especially in second and third row seating for mini-vans and SUVs. Generally, such seats have a deployed position suitable for supporting an occupant of the vehicle and a stowed position suitable to adapt the interior of the vehicle for conveying cargo.

Such seats usually include a seat back portion and a lower seat portion. Typically, a lower seat suspension is mounted directly to a lower seat frame and a lower seat cushion is mounted directly to the lower seat suspension and/or the lower seat frame. Thus, any deformation of the lower seat cushion or lower seat suspension caused by the weight of an occupant occurs within the frame space of the lower seat frame.

In an attempt to decrease the interior vehicle space occupied by the lower seat portion, the lower seat frame may be formed relatively smaller, such as by narrowing or foreshortening. If the lower seat frame is relatively narrow or otherwise configured such that the lower seat frame may cause discomfort for the occupant, extra foam thickness (increased cushioning) is typically added to improve comfort.

In one type of folding seat, the lower seat portion hinges forward into a vertical position and the seat back portion hinges forward to a horizontal position suitable for supporting cargo on the back of the seat back portion. In such a seat each of the lower seat portion and the seat back portion each move as a unit and occupy the same amount of space, although in a different configuration. In order to save space, the lower seat frame may be formed relatively smaller; however, this may cause discomfort for the occupant. The lower seat frame may include additional cushioning to increase comfort for the occupant; however, the space that would have been otherwise saved is lost.

Consumers of automotive vehicles desire foldable second and third row seats that are comfortable when deployed and take up the smallest possible space when stowed.

BRIEF SUMMARY OF THE INVENTION

This invention relates generally to vehicle seats and in particular to a foldable vehicle seat assembly.

The foldable vehicle seat assembly includes a seat back frame having a lower end adapted to be supported relative to a vehicle floor to permit movement of the seat back frame between an upper, deployed position and a lowered, stowed position. A seat cross member is adapted to be supported relative to the vehicle floor in a spaced relation to the seat back frame. A seat suspension member, constructed of a flexible material, has a rear portion connected to the seat back frame and a front portion connected to the cross member. When the seat back frame is moved between the deployed position and the stowed position, the cross member and the suspension member are also moved between a deployed position and a stowed position.

In another aspect the moveable cross member is a rotating front cross member movable between an upper, deployed position and a lowered, stowed position.

In a further aspect, this invention provides for a foldable vehicle seat assembly with improved stowability that provides for occupant comfort.

Various objects and advantages of this invention will become apparent to those skilled in the art from the following detailed description, when read in light of the accompanying drawings.

BRIEF DESCRIPTION OF THE DRAWINGS

FIG. 3 is an enlarged side view of a portion of the vehicle seat assembly of FIG. 1, shown partially in broken lines.

FIG. 4 is a front view of the portion of FIG. 3.

FIG. 5 is a side view of an alternate embodiment of the portion of the vehicle seat assembly shown in FIGS. 3 and 4.

DETAILED DESCRIPTION OF THE PREFERRED EMBODIMENT

Figure 1:
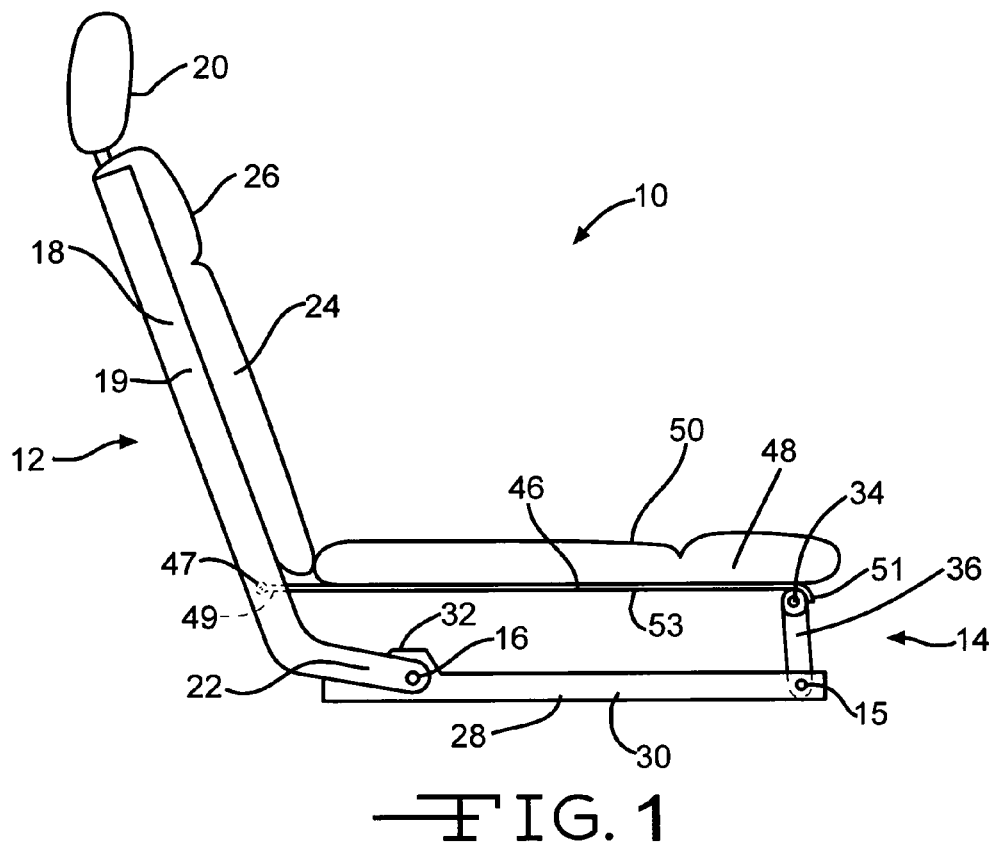
FIG. 1 is a side view of a vehicle seat assembly in accordance with a first embodiment of the present invention shown in a deployed position.
Figure 2:
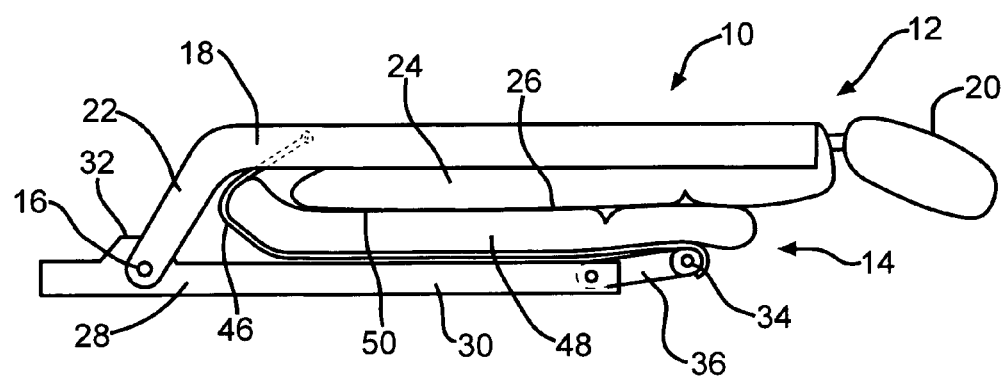
FIG. 2 is a side view of the vehicle seat assembly of FIG. 1 shown in the stowed position.

Referring now to the drawings, there is illustrated in FIGS. 1 and 2 a vehicle seat assembly 10 in accordance with a first embodiment of the present invention. The vehicle seat assembly 10 is moveable between an upper or upright, deployed position, as shown in FIG. 1, and a lowered, stowed position, as shown in FIG. 2. The vehicle seat assembly 10 generally includes a seat back portion 12 and a lower seat portion 14. The seat back portion 12 is moveably connected to the lower seat portion 14 about a pivot axis 16, as will be further discussed below. It must be understood, however, that the seat back portion 12 and the lower seat portion 14 may be connected in any suitable manner.

The seat back portion 12 includes a seat back frame 18. Any suitable framework can be used for the seat back frame 18 which supports an occupant thereon, such as a pair of laterally spaced frame members 19. An optional head rest assembly 20 is attached to a top end of the seat back frame 18. A pair of integrally formed pivot arms 22 (one shown) extend from opposite lateral sides of a bottom end of the seat back frame 18. The seat back frame 18 is moveably connected about the pivot axis 16 via the pivot arm 22, for example, by a bearing flange arrangement, an axle arrangement, or any other suitable arrangement. Preferably, the seat back frame 18 is lockable in its deployed and/or stowed positions such that the seat back frame 18 is selectively prevented from pivoting about pivot axis 16. Optionally, a recliner (not shown) may be used to adjust the angle of the seat back portion 12 relative to the lower seat portion 14 when the seat back portion 12 is in a deployed position.

A back cushion 24 is preferably mounted upon the seat back frame 18. The back cushion 24 may be made from any suitable material, such as foam, formed in any suitable manner, and mounted in any suitable manner. A back cover 26 is secured over the back cushion 24. The back cover 26 may be made of any suitable material, such as cloth or leather, and may be secured to the cushion in any suitable manner, such as by clips, snaps, adhesives, or stitching.

The lower seat portion 14 includes a lower seat frame 28 adapted to be mounted in a vehicle. For example, the lower seat frame 28 may be formed from two laterally spaced apart side members 30 which may be secured to a pair of front and rear cross members (not shown) with suitable attachments for mounting in a vehicle. Alternatively, the lower seat frame 28 may be formed from two laterally spaced apart side members 30 that are secured to or integrally formed with a track-rail arrangement for mounting to a vehicle. It must be understood, however, that the lower seat frame 28 may be formed in any suitable manner and be adapted in any suitable manner for mounting in a vehicle.

As illustrated, the lower seat frame 28 includes a pair of spaced apart lateral side members 30 (one shown). The lateral side member 30 includes a bearing tab 32 adjacent pivot axis 16 for supporting the connecting arrangement that moveably connects the seat back portion 12 to the lower seat portion 14. As shown, the pivot arm 22 of the seat back frame 18 is moveably connected to the lower seat frame 28 at the pivot axis 16. As previously discussed, the connecting arrangement may be by a bearing flange arrangement, an axle arrangement, or any other suitable arrangement. It must be understood that the bearing tab 32 may be formed integrally or separate from the lateral sided member 30, and may be formed and/or attached in any suitable manner. Further, the lower seat frame 28 need not include the bearing tab 32 at all, so long as the seat back portion 12 is suitably movably connected to the lower seat portion 14.

The lower seat frame 28 includes a moveable cross member 34. As shown, the moveable cross member 34 is a rotatable front cross member such that the cross member 34 is at a front portion of the seat assembly 10, although such is not required. For example, the moveable cross member may be located in the middle of the lower seat frame 28 and/or movable upon a guided track-rail or detent-groove arrangement. Alternatively, the moveable cross member 34 may be located in any suitable location and movable in any suitable manner.

The moveable cross member 34 is pivotally mounted upon the pair of lateral side members 30 at a pivot 15. As shown in FIGS. 3 and 4, the moveable cross member 34 is mounted to the pair of lateral side members 30 by one or more legs 36 (a pair of legs 36 is shown). Each of the pair of legs 36 is preferably rotatably connected to a respective one of the pair of lateral side members 30 at a first end and connected to the cross member 34 at a second end.

As best shown in FIGS. 3 and 4, the movable cross member 34 is a tubular member and the leg 36 is a dual posted leg. The cross member 34 and leg 36 are connected to the side member 30 by a nut and bolt fastening arrangement 38 and pivotal relative to the side member 30 by a bearing assembly 40. It must be understood, however, that the cross member may be movably connected to the lower seat frame 28 in any suitable manner.

Preferably, although not necessarily, the front cross member 34 is limited to rotation through an arc or radius defined by the deployed position and the stowed position of the vehicle seat assembly 10 via the pivoting legs 36. As illustrated, the rotatable front cross member is limited to rotation through an arc of approximately 90 degrees. The cross member 34 is limited to rotating at 90 degrees, as shown in a fully upright position, by a stop 42. The stop 42 may be any suitable device for limiting the movement of the cross member 34. An optional locking device may be included to hold or restrain the cross member 34 in the upright position. Such a device may be desirable so as to function as an "anti-submarine" aid in the event of an impact to the vehicle, i.e. resists movement during an impact to help maintain the cross member 34 in its deployed position.

The moveable cross member 34 may also be selectively lockable in the stowed position. The moveable cross member 34 is shown as selectively lockable in the stowed position by a spring load device 44. The spring load device 44 biases the cross member 34 to its stowed position. Note that the bias of the spring load device is overcome when moving the seat assembly 10 from its stowed position to its deployed position. The seat assembly 10 can be maintained in its upright, deployed position by a locking mechanism locking the seat back portion 12 in its deployed position.

It must be understood that any suitable selective locking device may be utilized for selectively locking the cross member in the deployed or stowed position. Such devices may include detent-spring ball mechanisms, and flexible locking tab assemblies, a gear-ratchet mechanical locks, or any other suitable selective locking devices. Further, it must be understood that the vehicle seat assembly 10 need not includes any selective locking mechanisms at all.

A pliable or flexible, i.e. freely bending or shaping to adjustments of varying condition, lower seat suspension member 46 is connected to the seat back frame 18 and connected to the moveable cross member 34 such that when the seat back frame 18 is moved relative to the lower seat frame 28 the lower seat suspension member is 46 moved between an upright, deployed position, as shown in FIG. 1, and a lowered, stowed position, as shown in FIG. 2. Preferably, the suspension member 46 is connected to the seat back frame 18 at a pivot point 47 as far rearward as possible in order to maximize space for the suspension member 46 in the stowed position. It must be understood, however, that such is not required.

The suspension member 46 preferably has a rectangular shape having a rear edge portion 49, the lateral ends of which are connected to the pair of seat back members 19 at pivot 47. The rear edge portion 49 may simply be suspended between the pair of seat back frame members 19 or include a rigid framework therebetween. The rectangular shaped suspension member 46 also includes a front edge 51 connected to the cross member 34 by any suitable manner, as will be discussed below. The suspension member 46 preferably includes longitudinally extending side edge portions 53 which are not connected to any rigid members, and thus may have slack therein when the seat assembly 10 is in its stowed position.

The lower seat suspension member 46 may be connected to the seat back frame 18 by any suitable arrangement such as a rod-pocket arrangement, clips, snaps, any suitable fastening arrangement, or any other suitable arrangement. As illustrated, the lower seat suspension member is connected to the cross member 34 by a tension clip arrangement 52. The clip arrangement 52 includes a clip 55 having a J-shaped cross-section connected to the front edge portion 51 of the suspension member, such as by stitching. A hook portion of the clip connects with a cooperating flange 57 attached to the cross member 34. It must be understood, however, that the lower seat suspension member 46 may be connected to the cross member 34 by any suitable arrangement such as a rod-pocket arrangement, clips, snaps, any suitable fastening arrangement, or any other suitable arrangement.

The suspension member 46 can be made of a stretchable, expandable material such that the surface area (longitudinal length and/or lateral width) can expand. Alternatively, the suspension member 46 may be made of a material not able to readily expand when pulled by a force. Preferably the lower seat suspension member 46 is made of a deformable fabric. The fabric may be in the form of a single sheet or a plurality of strips. For example, the fabric may be an elastomeric material, such as Riteflex®, a copolyester elastomer by Celanese Corporation. It must be understood, however, that the lower seat suspension member 46 may be made of any suitable fabric. Further, it must be understood that the suspension member may be made of any suitable material. For example, the suspension member 46 may be made of metal. In one embodiment of the present invention the suspension member 46 is formed from wire mesh. In another embodiment of the present invention, the suspension member is formed from at least one metal ribbon. In one example, flexible metal ribbon may be individually connected between the seat back frame and the moveable cross member. In another example, flexible metal ribbons are woven together to form a uniform suspension member connected between the seat back frame and the moveable cross member.

A lower seat cushion 48 is covered by a lower seat cover 50. The lower seat cushion 48 with the lower seat cover 50 is mounted upon the suspension member 46 and is at least partially supported by the suspension member 46 when the vehicle seat assembly 10 is in the deployed position. Thus, when the vehicle seat assembly 10 is in the deployed position the suspension 46 is preferably displaced away from the lower seat frame 28 or floor of the vehicle. It must be understood, however, that the vehicle seat assembly 10 need not include the cushion 48 and the cover 50. Rather, the suspension member 46 may form a suitable seating surface for the occupant.

The rigidity or tautness of the suspension member 46 may be changed as the seat back frame 18 is moved relative to the lower seat frame 28, e.g. moved between the deployed and the stowed positions. For example, in the stowed position there is slack in the suspension member 46 and thus the suspension member is not rigid. However, as the vehicle seat assembly 10 is deployed the connection location of the suspension member 46 on the back frame 18 moves in relative motion away from the connection location of the suspension member 46 on the cross member 34, and the suspension member 46 is pulled more taut through the motion and thereby becomes relatively more rigid.

As the vehicle seat assembly 10 is moved from the deployed to the stowed position, the cushion 48 may move forward relative to the suspension member 46 or may remain stationary relative to the suspension member 46. Thus, the cushion 48 may be directly attached to the suspension member 46, or may simply be rested and supported thereon. Alternatively, only portions, such as the edges of the cushion 48, may be connected to the suspension member 46. It is expected that the seat cushion 48 will move forward relative to the front cross member 34, at least in part due to the rotation of the cross member 34 relative to the seat cushion 48. Also, as shown in FIG. 2, the rear portions of the cushion 48 and the suspension member 46 may move upward towards the seat back portion 12 to allow the seat assembly to move to its stowed position. Thus, the rear lateral edges of the suspension member 46 preferably are not attached to rigid longitudinally extending members.

In an alternate embodiment, shown in FIG. 5, the vehicle seat assembly 10 also includes at least one cushion attachment strap 54 to guide the cushion 50 relative to the cross member 34 during movement. As, illustrated, the attachment strap 54 is secured to the cushion 48, such as by stitches 59, and to the cross member 34 by an attachment clip arrangement 56. It must be understood, however, that the attachment strap 56 may be secured to the cross member 34 by any suitable arrangement such as a rod-pocket arrangement, clips, snaps, any suitable fastening arrangement, or any other suitable arrangement. The vehicle seat assembly 10 may include a single attachment strap 54 placed to one side of the cross member 34 or formed as a flap that is formed along the front length of the cross member 34. Optionally, the vehicle seat assembly 10 may include a plurality of attachment straps 54 placed in any appropriate locations relative between the cushion 50 and the cross member 34. It must be understood, however, that the vehicle seat assembly 10 may include any suitably number of attachment straps 54 placed in any suitable location or may not include any attachment straps at all.

Thus, at least in one aspect, the present invention provides for separating the seat suspension of a vehicle seat from the lower frame to provide improved occupant to frame clearance (increased comfort) in the upright position while providing the lowest height in the folded position (improved stowability). In at least one embodiment, the suspension is attached to the back frame in the rear and to the top of a rotating cross member in front. This cross member may be spring-loaded to draw it to the folded position. It is brought to the upright position by the action of raising the seat back frame. This draws the suspension member and thereby the front cross member.

Thus, in at least one aspect, the present invention provides a foldable vehicle seat with increased stowability without compromising the comfort of the occupant.

Although the cross member 36 is shown attached to the side members 30, it should be understood that the seat assembly 10 may not include the lower seat frame 28 or the side members 30, and the cross member 36 may be alternatively attached to the floor of the vehicle or a bracket attached thereto. Also, the seat back portion 12 may be simply mounted to the floor of the vehicle about a pivot axis 16 and not directly to a lower seat frame 28.

Figure 6:
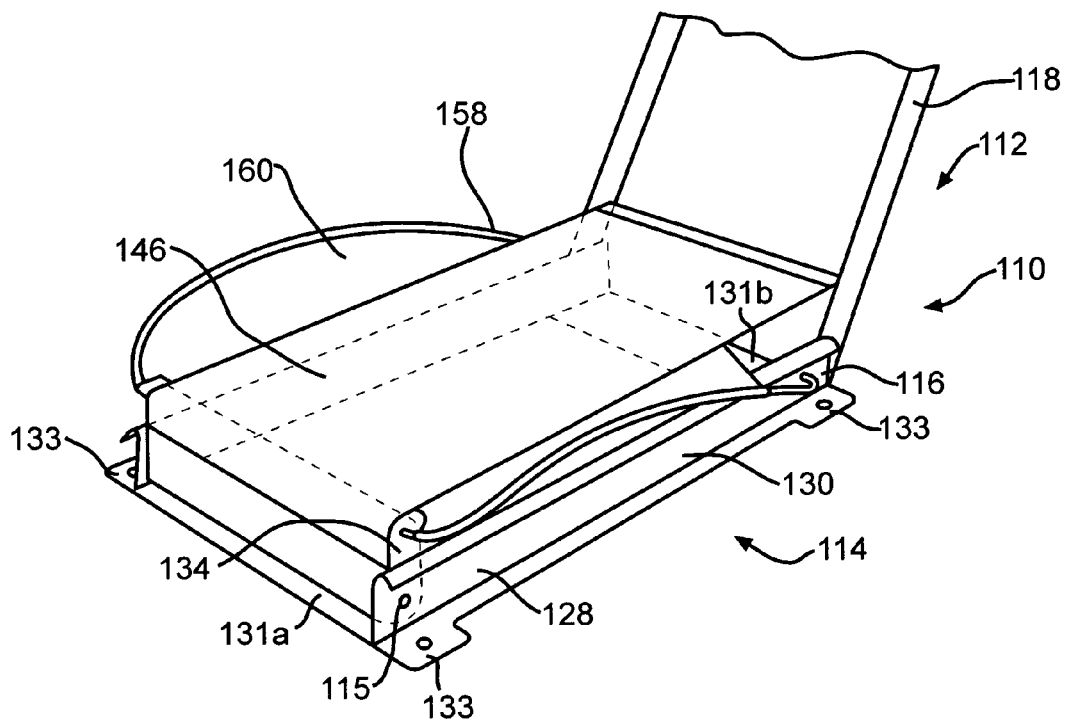
FIG. 6 is a perspective view of a vehicle seat assembly in accordance with a second embodiment of the present invention.

There is illustrated in FIG. 6 a vehicle seat assembly 110 in accordance with a second embodiment of the present invention. The vehicle seat assembly 110 is generally similar to the vehicle seat assembly 10, except as will be discussed below, and similar components are labeled with similar numbers, e.g. 110 is similar to 10.

The vehicle seat assembly 110 includes a seat back portion 112 moveably connected to a lower seat portion 114. The seat back portion includes a seat back frame 118. The lower seat portion 114 includes a lower seat frame 128. The seat back frame 118 is directly pivotably connected to the lower seat frame 128 at pivot 116.

The lower seat frame 128 includes laterally spaced apart side members 130 connected by front and rear cross member 131a and 131b. The side members 130 includes mounting tabs 133 suitable for mounting directly to the interior floor of a vehicle.

A movable cross member 134, in the form of a front paddle, is rotatably mounted between the side members 130 via pivot 115. A lower seat suspension member 146 is connected between the cross member 134 and the seat back frame 118.

A pair of bolster suspension members 158 are connected at a first end to the cross member 134 and at a second end to a rear portion of a respective side member 130. Bolster support portions 160 of the suspension member 146 extend to the bolster suspension members 158. The vehicle seat assembly 110 is configured such that the bolster support portions 160 are suitable to bolster the support of an occupant in the deployed position and as to efficiently store in the stowed position. In the stowed position the bolster support portions 160 may drape over the side members 130 and thus not interfere with the stowability of the seat, e.g. the inclusion of bolsters in the vehicle seat assembly 110 will not increase the overall height of the vehicle seat assembly 110 in the stowed position.

Figure 9:
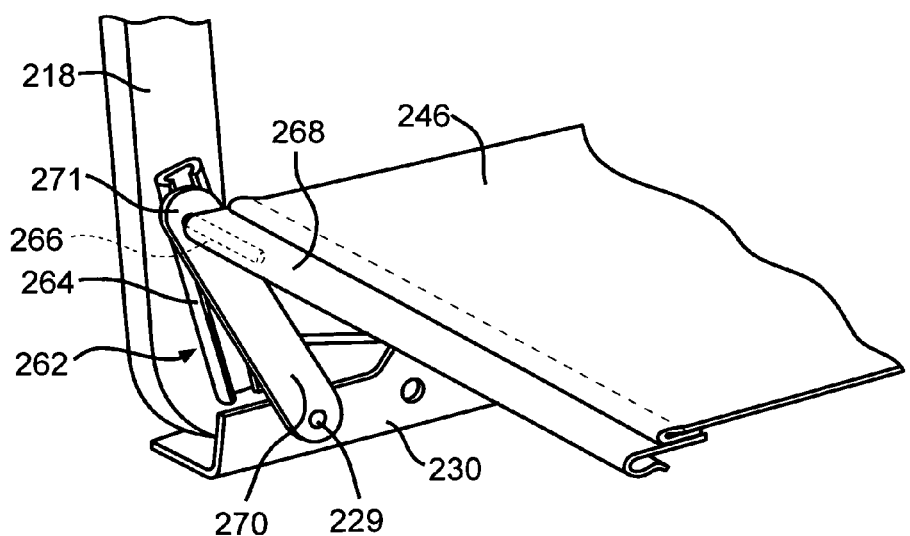
FIG. 9 is an enlarged perspective view of a portion of the vehicle seat assembly of FIG. 7.
Figure 7:
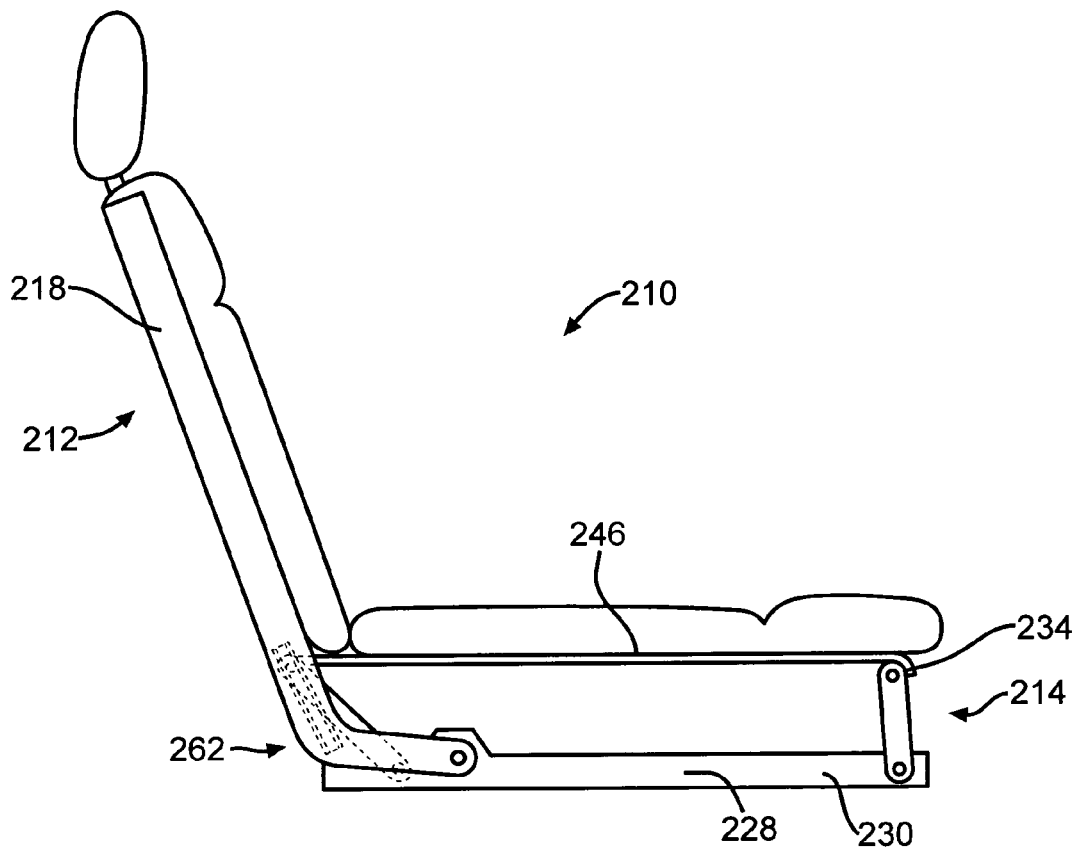
FIG. 7 is a side view of a vehicle seat assembly in accordance with a third embodiment of the present invention, shown in a deployed position.
Figure 8:
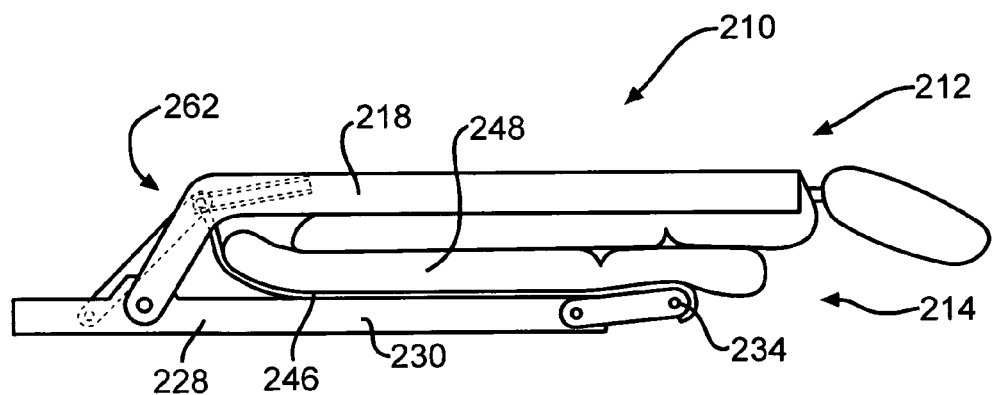
FIG. 8 is a side view of the vehicle seat assembly of FIG. 7, shown in the stowed position.

There is illustrated in FIG. 7-9 a vehicle seat assembly 210 in accordance with a third embodiment of the present invention. The vehicle seat assembly 210 is generally similar to the vehicle seat assembly 10, except as will be discussed below, and similar components are labeled with similar numbers, e.g. 210 is similar to 10.

The vehicle seat assembly 210 includes a seat back portion 212 moveably connected to a lower seat portion 214. The seat back portion 212 includes a seat back frame 218. The lower seat portion 214 includes a lower seat frame 228. The seat back frame 218 is directly pivotably connected to the lower seat frame 228.

The lower seat frame 228 includes laterally spaced apart side members 230. A movable cross member 234 is rotatably mounted between the side members 230. A lower seat suspension member 246 is connected between the cross member 234 and the seat back frame 218.

The suspension member 246 is connected to the seat back frame 218 by a sliding linkage assembly 262. As best shown in FIG. 9, the linkage assembly 262 includes a track 264 mounted to the seat back frame 218. A suspension engagement member 266 is slidably received in the track 264. As shown, the suspension engagement member 266 is a pin extending generally perpendicularly from a lateral side of the seat back frame 218. The suspension engagement member 266 may be an axle extending between opposing lateral sides of the seat back 218 or the suspension engagement member 266 may be any other suitable device.

The lower seat suspension member 246 is attached to the suspension engagement member 266. As shown, the lower seat suspension member 246 is attached to the suspension engagement member 266 by a suspension clip 268. It must be understood, however, that the lower seat suspension member 246 may be connected to the suspension engagement member 266 by any suitable arrangement such as a rod-pocket arrangement, clips, snaps, any suitable fastening arrangement, or any other suitable arrangement.

The vehicle seat assembly 210 further includes an optional guide bar 270. The guide bar 270 is rotatably connected at one end 271 to the suspension engagement member 266 and rotatably connected at the other end to the side members 230 of the lower seat frame 228 at a pivot 229.

As the seat back frame is moved between a deployed and a stowed position the suspension engagement member 266 slides along the track 264. The guide bar 270 guides the suspension engagement member 266 relative to the lower seat frame 228. This movement essentially alters the attachment point of the suspension member 246 to help reduce any undesirable upward movement of the rear portions of a cushion 248 and the suspension member 246.

While the principle and mode of operation of this invention have been explained and illustrated with regard to particular embodiments, it must be understood, however, that this invention may be practiced otherwise than as specifically explained and illustrated without departing from its spirit or scope.

What is claimed is:

1. A foldable vehicle seat assembly comprising:
   a seat back frame having a lower end adapted to be supported relative to a vehicle floor to permit movement of said seat back frame between an upper, deployed position and a lowered, stowed position;
   a movable seat cross member adapted to be supported relative to the vehicle floor in a spaced relation to said seat back frame; and
   a seat suspension member constructed of a flexible material, said suspension member having a rear portion connected to said seat back frame and a front portion connected to said movable cross member, wherein when said seat back frame is moved between said deployed position and said stowed position, said moveable cross member and said suspension member are also moved between a deployed position and a stowed position.

2. The vehicle seat assembly of claim 1 wherein said movable cross member is a pivotally mounted front cross member.

3. The vehicle seat assembly of claim 2 wherein said movable front cross member is limited to rotation through an arc defined by a deployed position and a stowed position of said rotatable front cross member.

4. The vehicle seat assembly of claim 3 wherein said arc is of approximately 90 degrees.

5. The vehicle seat assembly of claim 1 wherein said moveable cross member is selectively lockable in at least one of a deployed position and a stowed position.

6. The vehicle seat assembly of claim 5 wherein said moveable cross member is selectively lockable in the deployed position such that said moveable cross member resists movement during an impact.

7. The vehicle seat assembly of claim 5 further comprising a spring load device to selectively lock said moveable cross member.

8. The vehicle seat assembly of claim 1 wherein said suspension member is a deformable suspension member.

9. The vehicle seat assembly of claim 8 wherein rigidity of said suspension member is changed when said seat back frame is moved relative to the vehicle floor.

10. The vehicle seat assembly of claim 1 further comprising a seat cushion mounted upon said suspension member and at least partially supported by said suspension member when said vehicle seat assembly is in a deployed position.

11. The vehicle seat assembly of claim 1 wherein said seat suspension member is made of fabric.

12. The vehicle seat assembly of claim 11 wherein said fabric is an elastomeric material.

13. The vehicle seat assembly of claim 12 wherein said elastomeric material is a copolyester.

14. The vehicle seat assembly of claim 1 wherein said seat suspension member is made of metal.

15. The vehicle seat assembly of claim 14 wherein said metal forms a wire mesh.

16. The vehicle seat assembly of claim 1 wherein said suspension member comprises a plurality of strips.

17. The vehicle seat assembly of claim 1 wherein said movable cross member is tubular.

18. The vehicle seat assembly of claim 1 further comprising a lower seat frame includes a pair of spaced apart laterally extending side members, wherein said moveable cross member is mounted to said pair of lateral side members and disposed therebetween.

19. The vehicle seat assembly of claim 18 wherein said moveable cross member is mounted to said pair of lateral side members by a pair of legs.

20. The vehicle seat assembly of claim 19 wherein one of said pair of legs is rotatably connected to one of said pair of lateral side members at a first end and connected to a first end of said movable cross member at a second end, and wherein the other of said pair of legs is rotatably connected to the other of said pair of lateral side members at a first end and connected to a second end of said movable cross member at a second end.

* * * * *